(12) United States Patent
Michiels et al.

(10) Patent No.: US 9,819,486 B2
(45) Date of Patent: Nov. 14, 2017

(54) S-BOX IN CRYPTOGRAPHIC IMPLEMENTATION

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 328 days.

(21) Appl. No.: 14/577,342

(22) Filed: Dec. 19, 2014

(65) Prior Publication Data

US 2016/0182227 A1    Jun. 23, 2016

(51) Int. Cl.
*H04L 29/06* (2006.01)
*H04L 9/08* (2006.01)
*H04L 9/06* (2006.01)

(52) U.S. Cl.
CPC .............. *H04L 9/0838* (2013.01); *H04L 9/06* (2013.01); *H04L 2209/16* (2013.01); *H04L 2209/24* (2013.01)

(58) Field of Classification Search
CPC ..... H04L 9/06; H04L 9/0838; H04L 2209/16; H04L 2209/24
See application file for complete search history.

(56) References Cited

U.S. PATENT DOCUMENTS

| | | | |
|---|---|---|---|
| 6,031,911 A * | 2/2000 | Adams | H04L 9/0625 380/29 |
| 2007/0014394 A1 | 1/2007 | Harder et al. | |
| 2012/0002807 A1 | 1/2012 | Michiels | |
| 2015/0270949 A1 | 9/2015 | Michiels | |

FOREIGN PATENT DOCUMENTS

| | | |
|---|---|---|
| EP | 2922234 A1 | 9/2015 |
| WO | 2010102960 | 9/2010 |
| WO | WO2010102960 A1 | 9/2010 |

OTHER PUBLICATIONS

Syncrosoft MCFACT—Secure Data Processing Technology, Retrust Sixth Quarterly Meeting, Villach Austria, 108 pages, Mar. 11, 2008.
Billet, Olivier , Cryptanalysis of a white box AES implementation, Selected Areas in Cryptography—SAC 2004, (Helena Handschuh and M. Anwar Hasan, eds) Lecture Notes in Computer Science, vol. 3357, Springer, 2004, 227-240.
Biryukov, Alex et al., A Toolbox for Cryptanalysis: Linear and Affine Equivalence Algorithms, Advances Cryptology-EUROCRYPT 2003, Lecture Notes in Computer Science 2656 E. Biham (ed.), Springer-Verlag 2003, 33-50.

(Continued)

*Primary Examiner* — Brandon Hoffman
*Assistant Examiner* — Thong Truong

(57) ABSTRACT

A method of implementing a cryptographic operation using a substitution box, comprising: specifying a set of self-equivalent functions for the substitution box; determining the minimum diversification number of the substitution box over the set of self-equivalent functions; comparing the minimum diversification number to a threshold value; including and implementing a cryptographic operation with selected substitution box when the minimum diversification number is greater or equal to a threshold value.

17 Claims, 3 Drawing Sheets

(56) References Cited

OTHER PUBLICATIONS

Chow, et al., A White-Box DES Implementation for DRM Applications, Proceedings of the 2nd ACM Workshop on Digital Rights Management, 1-15, 2002.

Chow, et al., White-Box Cryptography and an AES Implementation, Proceedings of the 9th Annual Workshop on Selected Areas in Cryptography, 250-270, 2002.

Michiels, Opportunities in white-box cryptography, IEEE Security & Privacy, 8(1), 64-67, 2010.

Markku-Juhani 0 Saarinen: "Cryptographic Analysis of All 4×4—Bit S-Boxes", International Association for Cryptologic Research, vol. 20110712:145547, Jul. 12, 2011, pp. 1-18.

Plasmans M: "White-Box Cryptography for Digital Content Protection", A Internet Citation, May 2005, XP003019136, Retrieved from the Internet: URL:http://www.alexandria.tue.nljextraljafstvers1jwsk-i.plasmans2005.pdf.

International Extended Search Report for the International application No. EP 15197131.4 dated May 9, 2016.

* cited by examiner

S-BOX IN CRYPTOGRAPHIC IMPLEMENTATION

FIELD

Various exemplary embodiments disclosed herein relate generally to securing software or hardware components that perform a cryptographic function against attacks.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

Two main areas of vulnerability of digital rights management relying on encryption include the software modules which enforce the terms and conditions under which the content may be used, and the key distribution and handling. Typically, the software module enforces the terms and conditions under which the content is to be used. An attacker aiming to bypass these terms and conditions may attempt to achieve this through tampering of the program code of the software module.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of DRM and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete or at least substantial control of the system running the white-box cryptography software. Thus, the attacker may be able to modify inputs and outputs, track the operations of the software, sample and monitor memory used by the software at any time, and even modify the software. Accordingly, secure functions need to be carried out in a manner that prevents the disclosure of secret information used in the secure functionality.

There are various reasons why some prefer a software implementation of a cryptographic algorithm to a hardware implementation. This may, for instance, be the case because a software solution is renewable if the keys leak out, because it has lower cost, or because the application-developer has no influence on the hardware where the white-box system is implemented. However, whitebox implementations may be found in software and hardware.

Known whitebox implementations are found in: Chow, S., Eisen, P., Johnson, H., van Oorschot, P. C., *White-Box Cryptography and an AES Implementation*, Proceedings of the 9th Annual Workshop on Selected Areas in Cryptography, 250-270, 2002; and Chow, S., Eisen, P., Johnson, H., van Oorschot, P. C., *A White-Box DES Implementation for DRM Applications*, Proceedings of the 2nd ACM Workshop on Digital Rights Management 1-15, 2002.

SUMMARY

Although the appended claims are directed to particular combinations of features, it should be understood that the scope of the disclosure also includes any novel feature or novel combination of features disclosed herein.

Features which are described in the context of separate embodiments may also be provided in combination in a single embodiment. Conversely, various features which are, for brevity, described in the context of a single embodiment, may also be provided separately or in any suitable sub-combination.

Various exemplary embodiments relate to a method of implementing a cryptographic operation using a substitution box, comprising: specifying a set of self-equivalent functions for the substitution box; determining the minimum diversification number of the substitution box over the set of self-equivalent functions; comparing the minimum diversification number to a threshold value; including and implementing a cryptographic operation with selected substitution box when the minimum diversification number is greater or equal to a threshold value.

Various embodiments are described wherein a method of performing a cryptographic operation using a substitution box, including: receiving input data; encoding the input data using input functions of self-equivalent functions associated with the substitution box; applying the substitution box to the encoded data to produce output data wherein the substitution box has a minimum diversification number greater or equal to a predetermined threshold; and decoding the output data using output functions of the self-equivalent functions associated with the substitution box.

Various embodiments are described wherein a A method of performing a cryptographic operation using a substitution box, including: receiving input data; splitting the input data using input functions of self-equivalent functions associated with the substitution box; applying the substitution box to the split data to produce output data wherein the substitution box has a minimum diversification number greater or equal to a predetermined threshold; and combining the output data.

BRIEF DESCRIPTION OF THE DRAWINGS

In order to better understand various example embodiments, reference is made to the accompanying drawings, wherein.

To facilitate understanding, identical reference numerals have been used to designate elements having substantially the same or similar structure and/or substantially the same or similar function.

DETAILED DESCRIPTION OF EMBODIMENTS

Figure 1:
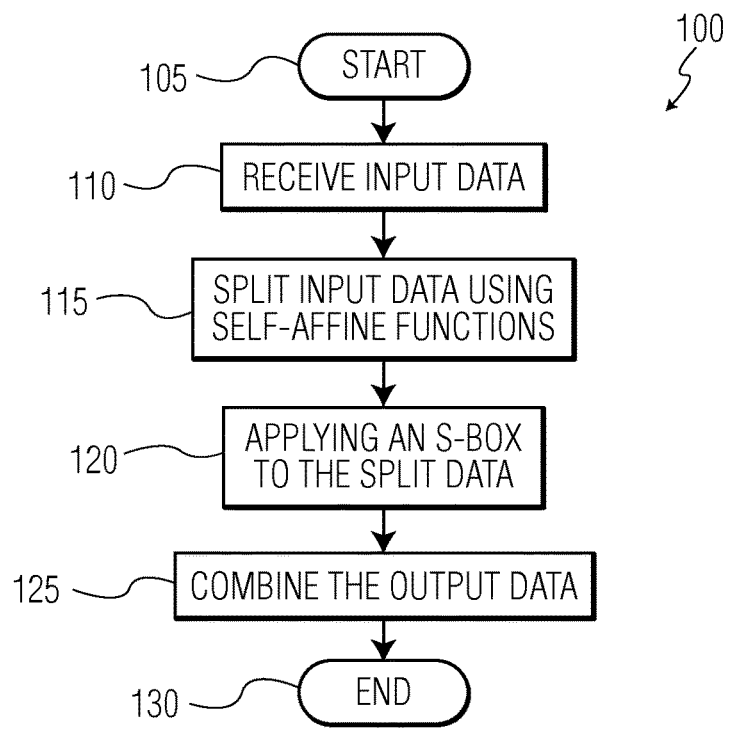
FIG. 1 illustrates a flow chart implementing a first cryptographic method.

It has proven difficult in whitebox cryptography to protect the inputs to the S-box layer of a symmetric cipher. Generally speaking, known attacks concentrate on the fixed encodings that are applied to the input of the S-boxes in the whitebox implementations disclosed in the two papers by Chow mentioned above. An approach to defeat these attacks can be found in US Patent Publication No. 2012/0002807 to Michiels ("Michiels 1"). This first approach works by encoding the input with a variable encoding. Another approach to defeat these attacks can be found in U.S. patent application Ser. No. 14/219,606 to Michiels ("Michiels 2"). This second approach works by splitting the input into chunks using splitting functions. Both of these approaches work by constructing for an S-box a set $V=V_1 \times V_2$ of self-equivalences, where $V_i$ is a set of affine functions. These self-equivalences are used by both Michiels 1 and Michiels 2. This may be illustrated by defining a set $V=V_1 \times V_2$ of self-equivalences of an S box, which means that $V=\{(\alpha,\beta) | \beta \circ S \circ \alpha^{-1} = S\}$ (where S is the S-box function). The functions in $V_1$ are affine and those in $V_2$ may be affine as well, but are not required to be affine. The functions from $V_1$ are used to map the input of an S-box to different values. Determining affine self-equivalent splitting functions may be done using any suitable manner. For example, as described in the paper "A Toolbox for Cryptanalysis: Linear and Affine Equivalence Algorithms," by A. Biryukov, C. De Canniere, A. Braeken, and B. Preneel, Proceedings of Eurocrypt, 2003, pp. 33-50 ("Biryukov"). In Biryukov, methods are described for determining affine self-equivalent functions for various encryption methods.

The first and second approaches will now be further described. In Michiels 1, variable encodings are put on the S-box inputs. If $(\alpha,\beta)$ is an affine self-equivalence of the AES S-box, then giving the S-box $\alpha(x)$ as input results in output $\beta(y)$, if $S(x)=y$. Let the affine self-equivalences be numbered from 1 onwards. Then, during execution an $\alpha i$-encoding can be put on the S-box input, where the choice of index i (i.e., the choice of the affine self-equivalence) is computation dependent. In an additional computation track, the value i (in encoded form) is kept track of. After the S-box, this value i is used to compensate for the variable encoding that has been put on the S-box input.

In Michiels 2, various splitting functions $\alpha_n$ may be used on the input to the S-box. A splitting function $\alpha_n$ provides a different way to represent a data value. Typically, the splitting function $\alpha_n$ is also bijective, although this is not necessary.

A set of self-equivalent splitting functions may be used to split the input. For example, if x is an input to an S-box and y is the output, then a pair of functions $\alpha$ and $\beta$ are self equivalent if an input $\alpha_n(x)$ to the S-box results in an output $\beta_n(y)$. Such functions provide benefit in splitting the input to the S-box, for if the $\beta$ functions are selected so that their combination results in the output value y or a known function of y, then when the equivalent a functions are used to split the input, it is easy to obtain the desired output from the S-box while breaking the fixed encoding that may be exploited an attacker.

The effectiveness of using the self-equivalent affine functions with an S-box increases with the number of output values to which each input value can be mapped. When using self-equivalences, a vulnerability occurs if V1 has constant points, where a point x is called a constant point if for all functions $f \in V1$ the point $\theta(x)$ is the same. The existence of constant points for V1 is a weakness of these approaches that may be exploited by an attacker because the encoding becomes fixed for that value of x.

The effectiveness of these approaches increase with the number of values $D(x)$ to which each value x can be mapped. We call $D(x)$ the diversification number of x. Formally, this means $D(x)=|\{\theta(x)|f \in V1\}|$. Accordingly, $D(x)$, the diversification number should be as large as possible, i.e., as close to the size of the domains of V1 as possible.

Thus, it is a goal to construct an S-box in a substitution-affine-transformation network (or in a cipher containing such a network used as a building block) which does not suffer from the weakness mentioned above, i.e., which does not have any constant points, and which has a minimum diversification number for all input values to the network which is as close as possible to the size of the domain of input values, although smaller values may be tolerable in practice such as values as low as 5.

Somewhat more formally, the requirement above may be rephrased as: it is desired to construct an n-bit S-box in a substitution-affine-transformation network (or a cipher containing such as network used as a building block) such that it includes a set $V=V_1 \times V_2 \subseteq \{(\alpha,\beta) | \beta \circ S \circ \alpha^{-1}=S\}$ of self-equivalences with $\alpha,\beta$ having some additional properties as discuss below, such that the minimum diversification number of the input values is close to the domain size (typically $2^n$) of S.

In addition, it is desired that the set $V_1$ includes affine functions and the set $V_2$ includes functions with one of the following properties (or both):
  a) similar to $V_1$, it includes affine functions only; or
  b) there exists an m such that for each $(\alpha,\beta) \in V$ we can find m−1 other function pairs in V with the property that the right-hand sides of these pairs XOR to some affine function h or more precisely, for all $(\alpha,\beta) \in V$ there exists and $\Gamma \in V^{m-1}$ with $\Gamma_i=(\alpha_i, \beta_i)$ such that $\forall_x$ $\beta(x) \oplus (\oplus_i \beta_i(x))=h(x)$.

Now an example of an embodiment of a cryptographic system using a cipher will be described that uses an S-box with the above described properties that has a high minimum diversification number. The cipher is a Feistel cipher. A Feistel cipher has the following structure. The input is split into two parts of equal size. These are denoted as the left side (L0) and the right side (R0). When encrypting, r+1 rounds are performed, wherein for rounds i=0, 1, . . . , r the following is computed:

$$L_{i+1}=R_i$$

$$R_{i+1}=L_i \oplus F(R_i,K_i)$$

Here, F is a round function and $K_0, K_1, \ldots, K_n$ are round keys. When decrypting, the process is reversed. This means that r+1 rounds are performed, wherein for rounds r−i with i=r, r−1, . . . , 0 the following is computed:

$$R_i=L_{i+1}$$

$$L_i=R_{i+1} \oplus F(L_{i+1},K_i)$$

Feistel ciphers are well known in the art. An important property of a Feistel cipher is that the round function F need not be invertible.

The proposed cipher further may have, for example, 16 rounds and a block size of 128. The round function F may be defined as a substitution-affine-transformation network. Such network may contain successively: (i) a key-addition operation; (ii) an expansion operator; (iii) an S-box layer; and (iv) a matrix multiplication. Formally, the above round function may be written as:

$$F:2^{64} \rightarrow 2^{64} \text{ with } F(x)=M \circ S_8 \circ E \circ \oplus_K(x), \quad (1)$$

In this definition, $\oplus_K$ denotes the function that XORs its 64-bit input with a 64-bit key K. This is a 64 bit operation because as described above a Feistel cipher is used that splits the 128-bit state in half and performs operations on each half. The expansion function, E, expands its input by adding a 1-bit after each byte. M is some arbitrary 64×72-bit matrix (but in the cipher specification it is fixed). $S_8$ is an S-box layer including the application of the S-box 8 times where the S-box is a 9-bit S-box $S:2^9 \rightarrow 2^9$, which will be specified below. The S-box layer $S_8$ splits its 72-bit input into words of 9 bits and applies the S-box S to each of these 8 words.

Now an S-box will be specified that has the properties described above to achieve a high minimum diversification number. The AES S-box is given by multiplicative inverse in GF(28) followed by a fixed affine mapping (which mapping is prescribe by the AES specification). However, an S-box may be described as only a multiplicative inverse, i.e., $S(x)=x^{-1}$. Furthermore, this inverse is taken in GF(29) instead of GF(28). Because of the expansion operator E, each input to S-box S starts with a 1, implying that the input is guaranteed to be non-zero. Hence, the S-box has $S:29\setminus\{0\} \rightarrow 29\setminus\{0\}$. Furthermore, the set V may be described as:

$$V=\{(\alpha,\beta) | \exists_{c \in GF(2^9)} \alpha:x \mapsto c \cdot x, \beta:x \mapsto c^{-1} \cdot x\} \text{ with } c \neq 0$$

that defines a set of self-equivalences for S. It is easily verified that the diversification number of each element in the domain of S, i.e., each 9-bit value except for 0, equals $2^9-1$. Hence, the S-box has the sought-after property, i.e., having a diversification number which is very close to the size of the domains of set $V_1$ (more precisely, one less than the size of such domains).

FIG. 1 illustrates a flow chart implementing a cryptographic method. The method 100 begins at 105 and then receives input data 110. The input data may be plain text data or encrypted data. The input data will be plain text if the cryptographic function is an encryption function. If the cryptographic function is a decryption function, the input data may be encrypted data. Next, the method 100 splits the input data using the self-affine functions 115. This splitting is not a fixed splitting and may be applied as described by Michiels 2. The method 100 then applies the S-box to the split data to produce output data where the S-box has a minimum diversification number greater than a predetermined threshold 120. For example, the predetermined threshold value may be 5. In some implementations, such as many white-box implementation, the S-box may be merged with the encryption key. Next, the method 100 combines the output data 125. The combining will correspond to the splitting used. The method may then end at 130. The method 100 corresponds to a single round in a more complex cryptographic function that includes and repeats a number of rounds. Further, the method 100 may also operate on a portion of the data to be encrypted/decrypted, and in such a case the method 100 may be repeated for each portion of the data to be encrypted/decrypted.

Figure 2:
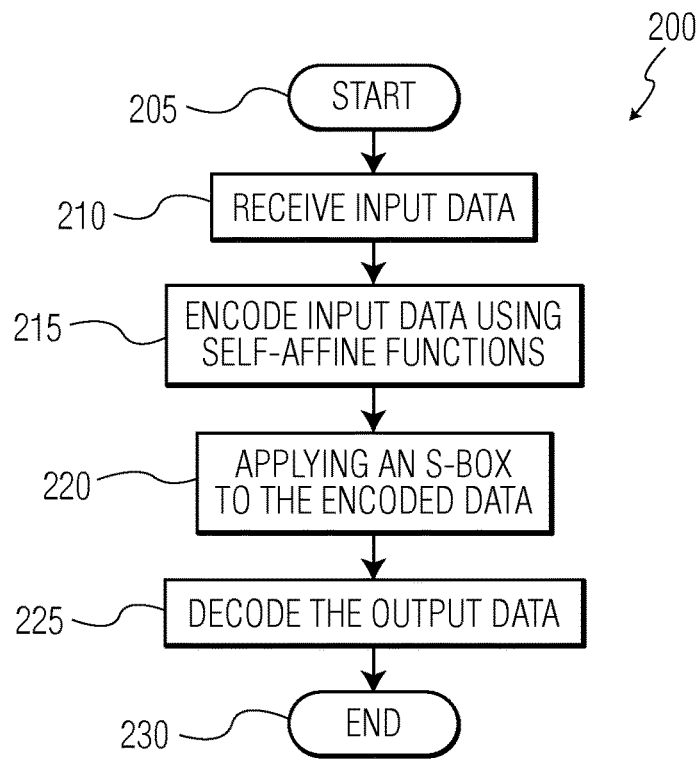
FIG. 2 illustrates a flow chart implementing a second cryptographic method.

FIG. 2 illustrates a flow chart implementing a second cryptographic method. The method 200 begins at 205 and then receives input data 210. The input data may be plain text data or encrypted data. The input data will be plain text if the cryptographic function is an encryption function. If the cryptographic function is a decryption function, the input data may be encrypted data. Next, the method 200 encodes the input data using the self-affine functions 215. This encoding is not a fixed encoding and may be applied as described by Michiels 1. The method 200 then applies the S-box to the encoded data to produce output data where the S-box has a minimum diversification number greater than a predetermined threshold 220. In some implementations, such as many white-box implementation, the S-box may be merged with the encryption key. Next, the method 200 decodes the output data 225. The decoding will correspond to the encoding used. The method may then end at 230. The method 200 correspond to a single round in a more complex cryptographic function that includes and repeats a number of rounds. Further, the method 200 may also operate on a portion of the data to be encrypted/decrypted, and in such a case the method 200 may be repeated for each portion of the data to be encrypted/decrypted.

Figure 3:
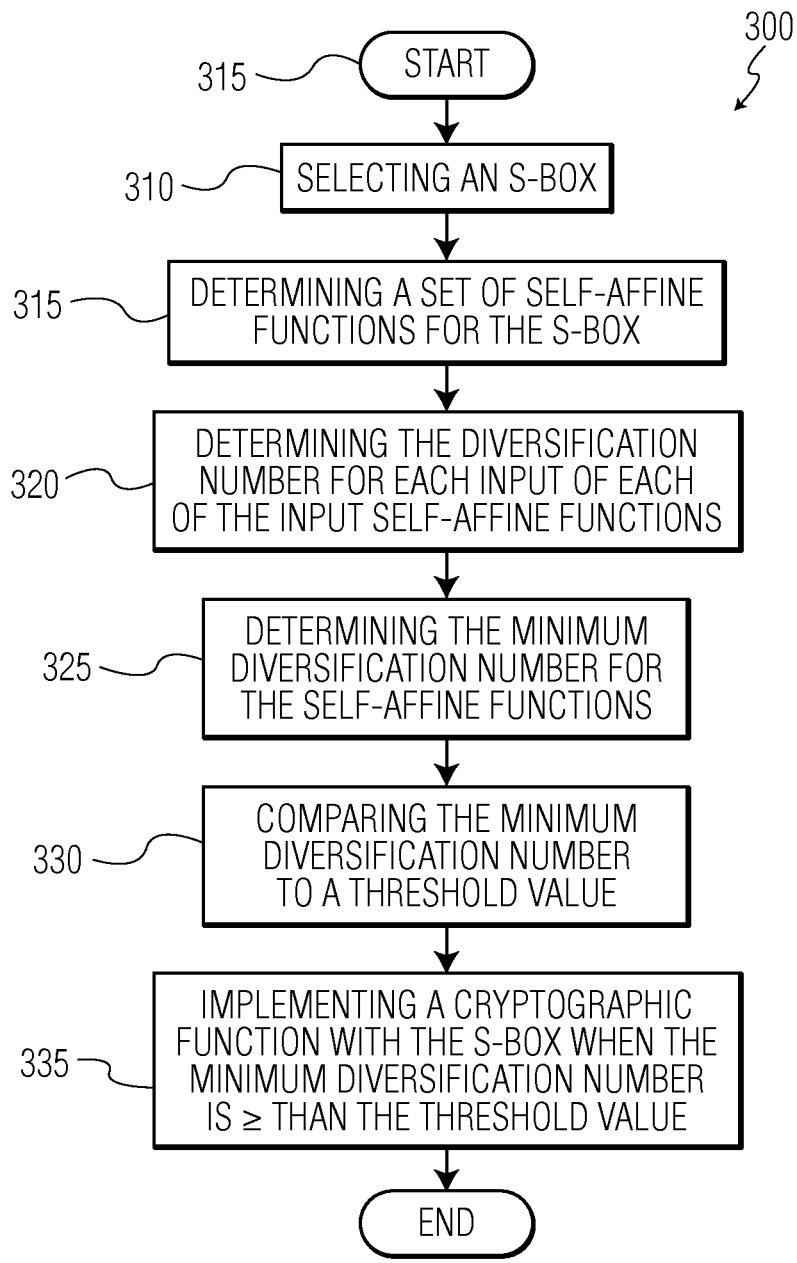
FIG. 3 illustrates a method for identifying an S-box having a minimum diversification number above a predetermined threshold.

FIG. 3 illustrates a method for identifying an S-box having a minimum diversification number above a predetermined threshold. The method 300 may begin at 305. Next the method 300 selects an S-box 310. The S-box will be a substitution box that will be used in a cryptographic function. Then the method 300 will determine a set of self-affine functions for the S-box 315. This may be done as described above in Biryukov. Any other methods that determine the set of self-affine functions for an S-box may be used as well. Next the method 300 determines the diversification number for each input of input self-affine functions 320. The input function of the self-affine function pair is the function, described above as either a or V1, applied to the input of the S-box. These input functions will have an input domain. Each value in that input domain will have a diversification number that indicates the number of different elements in the output domain of the input functions for that value. This may be accomplished, for example, by inputting each of the input domain values into the input function, and then determining the number of unique output values that result across the functions for each input. Then the method 300 may determine the minimum diversification number for the set of the previously determined self-affine functions 325. Next the method 300 may compare the minimum diversification number to a threshold value 330. The method 300 may then implement a cryptographic function using the S-box when the minimum diversification number is greater than or equal to the threshold value 335. The cryptographic function may be any type of cryptographic function that uses an S-box. The method may then end at 340. In the case where the S-box does not have any self-affine functions (other than the obvious identify function) or where the minimum diversification number is less than the threshold value, the method 300 may end.

A service or content provider or other type of provider may create or obtain program code embodying the inventions described herein. Illustratively, such code may contain a symmetric key cipher with an S-box and/or round function as described herein. The code may be stored upon a server under control of the provider. The server may store the code in a non-transitory machine readable storage medium. Upon request from a user, the provider may permit the download of the code to the user; the code being stored by the user in a non-transitory machine readable storage medium. Prior to the download, the non-transitory machine readable storage medium was in a first state and the downloading thereby transforms the non-transitory machine readable storage medium into a second state. The process of downloading may also create state transformations in the non-transitory machine readable storage medium of the server. Subsequently, the same or another provider (herein termed the "second provider", although the second provider may be the first provider) may create or obtain information (such as financial information, entertainment content, gaming content, etc.) which is encrypted using the symmetric key cipher. The second provider may permit the download of the encrypted information by the same user. This encrypted information or portions of the encrypted information may be stored by the user on non-transitory machine readable storage medium, thus transforming such non-transitory machine readable storage medium from a first state to a second state. The user may, using the already downloaded symmetric key cipher, decipher the information and use the information for entertainment, gaming, financial planning, etc. Thus a secure information or content exchange between a provider and a user is enabled.

Figure 4A:
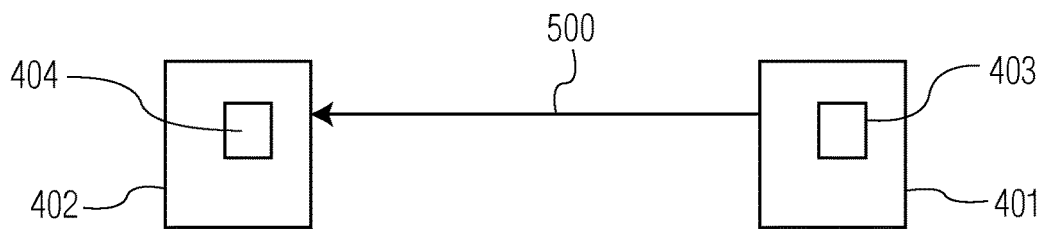
FIGS. 4A to 4D illustrate systems implementing the cryptographic methods described herein.
Figure 4B:
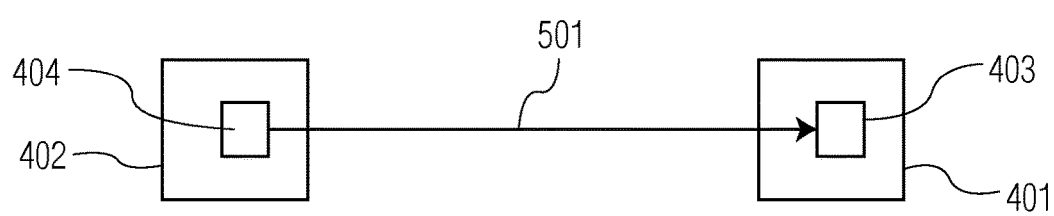
Figure 4C:
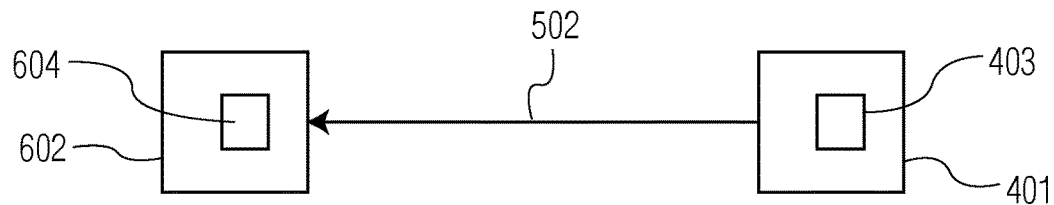
Figure 4D:
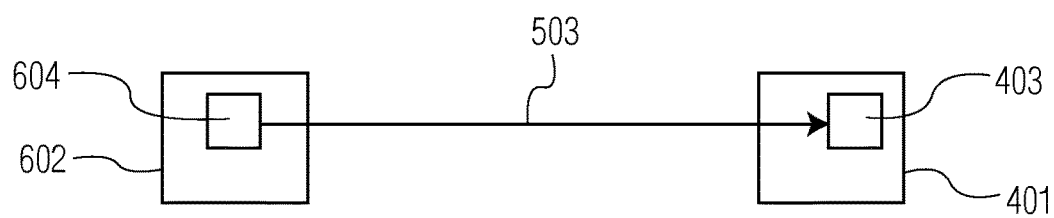

Such is illustrated in FIGS. 4A-D. In FIG. 4A, user device 401, which may be a computer, smart phone, smart card, etc. as further listed below, contains non-transitory machine readable storage device 403, (for convenience termed "memory" in the discussion of FIGS. 4A-D) which is in a first state. Provider device, 402, which, illustratively, may be a server or computer, has memory 404 in a first state containing an embodiment of the invention as described in the form of a symmetric key cipher. User device 401 sends a request 500 to provider device 402. The user device 401 may be any device with a memory and a processor capable of receiving the symmetric key cipher. Subsequently, in FIG. 4B, provider device 402 sends a copy of the symmetric key cipher (such transmission indicated by reference numeral 501) to user 401. Storage of the symmetric key cipher by user device 401 results in a transformation in memory 403 from a first state to a second state. Furthermore, the retrieval of the symmetric key cipher from provider memory 404 results in various state changes in memory 404 (due to the processes used to retrieve the symmetric key cipher). Now, user device 401 may send a request to either the same provider device 402 or to another provider device 602. In FIG. 4C, the request is sent to another provider device 602, but provider device 402 might also be the recipient of the request. In FIG. 4D, the provider device 602 provides information 503 (as described above, such as financial information, entertainment content, gaming content or other information) which is encrypted with the symmetric key cipher to user device 401. Storage of the encrypted information in memory 403 (or in a different memory under control of the user) results in a transformation of such memory from a first state to a second state. Subsequently, user device 401 decrypts the encrypted information using a processor 408 and uses the information. In some embodiments, user device 401 may be two devices, one of which receives the symmetric key cipher and the other of which receives the encrypted information. Linking of the devices enables the decryption to take place on one or the other of the two devices through, for example, secure transmission of the symmetric key from the device which originally received such symmetric key to the other device.

The processes described herein may be advantageously used even under circumstances in which the control of the user device 401 is in the hands of an adversary who is attempting to deduce the symmetric key or the cipher. The sender (and user) of the encrypted information may enjoy enhanced security even under a variety of adverse conditions.

The embodiments of the invention may be applied to a wide variety of cryptographic methods and apparatus, including, for example, symmetric and asymmetric cryptographic operations and apparatus. The invention may be applied to hash functions. The latter is especially useful if the hash function is used in a keyed Hash Message Authentication Code (HMAC or KHMAC). A method according to the embodiments of the invention may be implemented on a computer as a computer implemented method, or in dedicated hardware, or in a combination of both. Executable code for a method according to the invention may be stored on a non-transitory machine readable storage medium. Examples of such media include memory devices, optical storage devices, integrated circuits, servers, online software, smart cards, special purpose computers, processors, etc.

In an embodiment of the invention, a computer program may include computer program code adapted to perform the steps of a method according to the invention when the computer program is run on a computer. Preferably, the computer program is embodied on a non-transitory machine readable storage medium.

Further, because white-box cryptography is often very complicated and/or obfuscated it is tedious for a human to write. It is therefore of advantage to have a method to create the cryptographic system according to the embodiments of the invention in an automated manner.

The methods of creating the cryptographic system according to the invention may be implemented on a computer as a computer implemented method, or in dedicated hardware, or in a combination of both. Executable code for a method according to the invention may be stored on a non-transitory machine readable storage medium. In such a method, the computer program may include computer program code adapted to perform all the steps of the method when the computer program is run on a computer.

Algorithms that result from the method of creating the cryptographic system according to the invention may be implemented on a computer as a computer implemented method, or in dedicated hardware, or in a combination of both. Executable code for an algorithm according to the invention may be stored on a non-transitory machine readable storage medium. In such a method, the computer program may include computer program code adapted to perform all the steps of the algorithm when the computer program is run on a computer.

Any combination of specific software running on a processor to implement the embodiments of the invention, constitutes a specific dedicated machine.

A hardware system implementation of the embodiments of the invention may include hardware elements implementing the basic blocks of a white-box implementation. These hardware elements may include, for example, lookup tables or finite state machines. These hardware elements may be interconnected to fully carry out such white-box implementation.

As used herein, the term "non-transitory machine-readable storage medium" will be understood to exclude a transitory propagation signal but to include all forms of volatile and non-volatile memory.

As used herein, the term "processor" will be understood to encompass a variety of devices such as microprocessors, field-programmable gate arrays (FPGAs), application-specific integrated circuits (ASICs), and other similar processing devices. When software is implemented on the processor, the combination may become a single specific machine.

It should be appreciated by those skilled in the art that any block diagrams herein may represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

Various illustrative embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The embodiments of the invention have been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A method of producing a white-box implementation of a cryptographic operation using a substitution box, comprising:

specifying a set of self-equivalent functions $\alpha(x)$, $\beta(y)$ for the substitution box $S(x)$, wherein when $\alpha(x)$ is input to the substitution box the output of the substitution box is $\beta(y)$ when $S(x)=y$, wherein x in an input to the substitution box and y is the output of the substitution box;

determining a minimum diversification number of the substitution box over the set of self-equivalent functions;

comparing the minimum diversification number to a threshold value; and implementing the white-box implementation of the cryptographic operation with selected substitution box when the minimum diversification number is greater than or equal to the threshold value, wherein the white-box implementation of the cryptographic operation is software that securely performs the cryptographic operation on an untrusted user device.

2. The method of claim 1, wherein:
set of self-equivalent functions includes a set of input functions and a set of output functions for the substitution box;
determining the minimum diversification number of the substitution box further comprises determining the diversification number for each input of each of the input functions; and
determining the minimum diversification number among the diversification numbers for each input of each of the input functions.

3. The method of claim 2, wherein the cryptographic operation comprises:
receiving input data;
splitting the input data using the self-equivalent functions;
inputting the split input data into the substitution box to obtain output data; and
combining the output data.

4. The method of claim 1, wherein the cryptographic operation comprises:
receiving input data;
encoding the input data using the self-equivalent functions;
inputting the encoded input data into the substitution box to obtain output data; and
decoding the output data using the output functions.

5. The method of claim 4, wherein encoding the input data further comprises:
selecting one of the set of self-equivalent functions based upon the input data having an associated identifier; and
securely communicating the associated identifier to a decoder decoding the output data.

6. The method of claim 5, wherein decoding the output data further comprises decoding the output data using an self-equivalent function identified by the securely communicated identifier.

7. The method of claim 1, wherein input functions of the self-equivalent functions are affine.

8. The method of claim 7, wherein output functions of the self-equivalent functions are affine.

9. The method of claim 1, wherein the threshold value is 5.

10. A method of performing a white-box implementation of a cryptographic operation using a substitution box, comprising:
receiving, by an untrusted user device, input data;
encoding, by the untrusted user device, the input data using input functions of self-equivalent functions $\alpha(x)$, $\beta(y)$ associated with the substitution box $S(x)$, wherein when $\alpha(x)$ is input to the substitution box the output of the substitution box is $\beta(y)$ when $S(x)=y$, wherein x in an input to the substitution box and y is the output of the substitution box;
applying, by the untrusted user device, the substitution box to the encoded data to produce output data wherein the substitution box has a minimum diversification number greater than or equal to a predetermined threshold; and
decoding, by the untrusted user device, the output data using output functions of the self-equivalent functions associated with the substitution box.

11. The method of claim 10, wherein the predetermined threshold is 5.

12. The method of claim 10, wherein encoding the input data further comprises:
selecting one of the input functions based upon the input data having an associated identifier; and
securely communicating the associated identifier to a decoder decoding the output data.

13. The method of claim 12, wherein decoding the output data further comprises decoding the output data using the output function identified by the securely communicated identifier.

14. A method of performing a white-box implementation of a cryptographic operation using a substitution box, comprising:
receiving, by an untrusted user device, input data;
splitting, by the untrusted user device, the input data using input functions of self-equivalent functions $\alpha(x)$, $\beta(y)$ associated with the substitution box $S(x)$, wherein when $\alpha(x)$ is input to the substitution box the output of the substitution box is $\beta(y)$ when $S(x)=y$, wherein x in an input to the substitution box and y is the output of the substitution box;
applying, by the untrusted user device, the substitution box to the split data to produce output data wherein the substitution box has a minimum diversification number greater than or equal to a predetermined threshold; and
combining, by the untrusted user device, the output data.

15. The method of claim 14, wherein the predetermined threshold is 5.

16. The method of claim 14, wherein:
splitting the input data further comprises splitting the input data into N split input data using N input functions based upon the input data; and
inputting the split input data into the substitution box to obtain output data further comprises inputting the N encoded input data into the substitution box to obtain N output data.

17. The method of claim 16, wherein combining the output data further comprises combining the N output data.

* * * * *